United States Patent
Heredia

(10) Patent No.: US 8,936,307 B2
(45) Date of Patent: Jan. 20, 2015

(54) MULTIPURPOSE TRAY

(75) Inventor: Homero Heredia, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 268 days.

(21) Appl. No.: 13/535,780

(22) Filed: Jun. 28, 2012

(65) Prior Publication Data

US 2013/0001987 A1   Jan. 3, 2013

Related U.S. Application Data

(60) Provisional application No. 61/501,892, filed on Jun. 28, 2011.

(51) Int. Cl.
*B64D 11/00* (2006.01)
*B64D 11/06* (2006.01)

(52) U.S. Cl.
CPC .......... *B64D 11/0015* (2013.01); *B64D 11/06* (2013.01); *B64D 2011/0679* (2013.01)
USPC .... 297/146; 297/163; 297/188.05; 297/217.3

(58) Field of Classification Search
USPC ................ 297/146, 163, 169, 188.05, 217.3
See application file for complete search history.

(56) References Cited

U.S. PATENT DOCUMENTS

| | | | |
|---|---|---|---|
| 354,870 A * | 12/1886 | Munger | 297/167 |
| RE10,825 E * | 4/1887 | Peard | 297/169 |
| 3,167,036 A * | 1/1965 | Brossard | 108/4 |
| 4,584,603 A | 4/1986 | Harrison | |
| 4,630,821 A * | 12/1986 | Greenwald | 297/163 |
| 4,756,528 A | 7/1988 | Umashankar | |
| 4,792,183 A | 12/1988 | Townsend | |
| 5,443,018 A * | 8/1995 | Cromwell | 108/44 |
| 5,695,240 A | 12/1997 | Luria | |
| 6,454,349 B1 | 9/2002 | Konya | |
| 6,814,404 B2 * | 11/2004 | Jensen | 297/146 |
| 2003/0184957 A1 | 10/2003 | Stahl et al. | |

FOREIGN PATENT DOCUMENTS

DE     10118496 A1   10/2002
FR     2908702 A1    5/2008

OTHER PUBLICATIONS

International Preliminary Report on Patentability dated Jan. 16, 2014 in Application No. PCT/US2012/044549.
International Search Report and Written Opinion dated Oct. 10, 2012 in Application No. PCT/US2012/044549.

* cited by examiner

*Primary Examiner* — Peter Brown
(74) *Attorney, Agent, or Firm* — Kilpatrick Townsend & Stockton LLP; Dean W. Russell, Esq.; Tiffany L. Williams, Esq.

(57) ABSTRACT

Described are multipurpose tray table systems including a passenger seat back, at least one tray table arm pivotally coupled to the passenger seat back, and a tray table pivotally coupled to the at least one tray table arm, comprising a first surface and a second surface, wherein the tray table may be deployed away from the passenger seat back via rotation of the at least one tray table arm about the passenger seat back to a first deployed position, and the tray table may be rotated about the at least one tray table arm into an adjusted deployed position such that the first surface of the tray table faces generally toward the passenger seat back and the second surface of the tray table faces generally away from the passenger seat back.

17 Claims, 5 Drawing Sheets

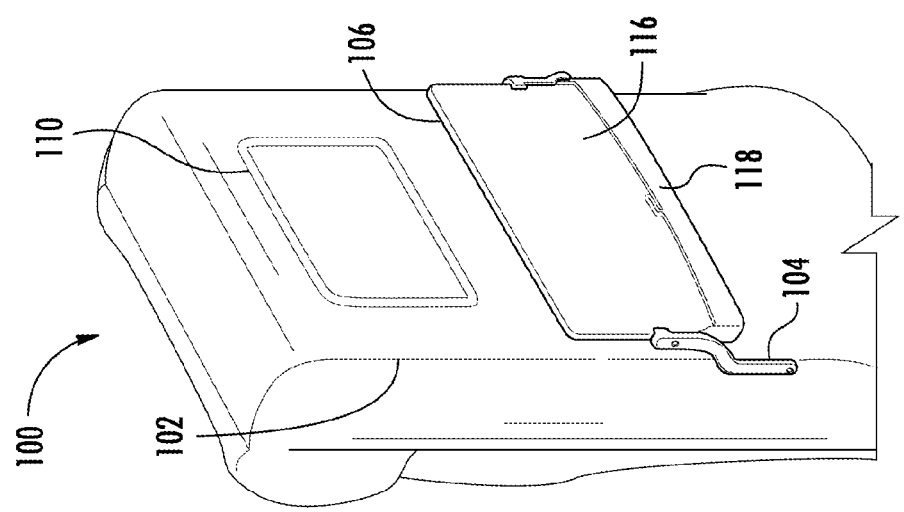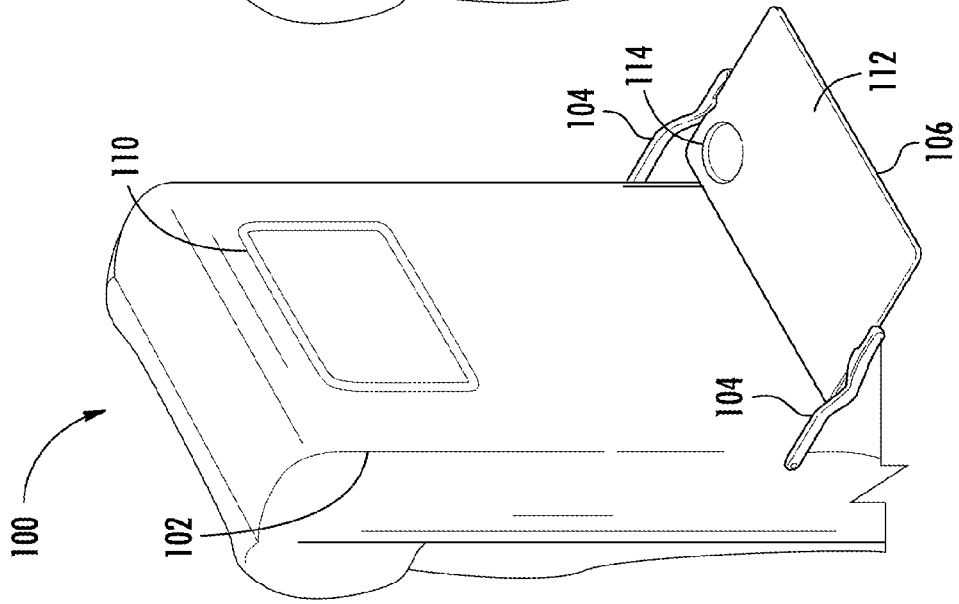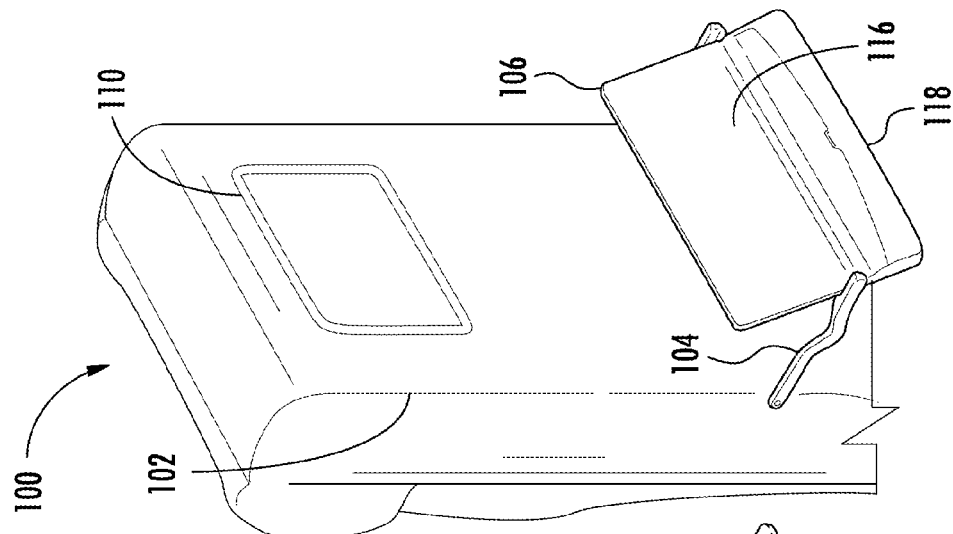

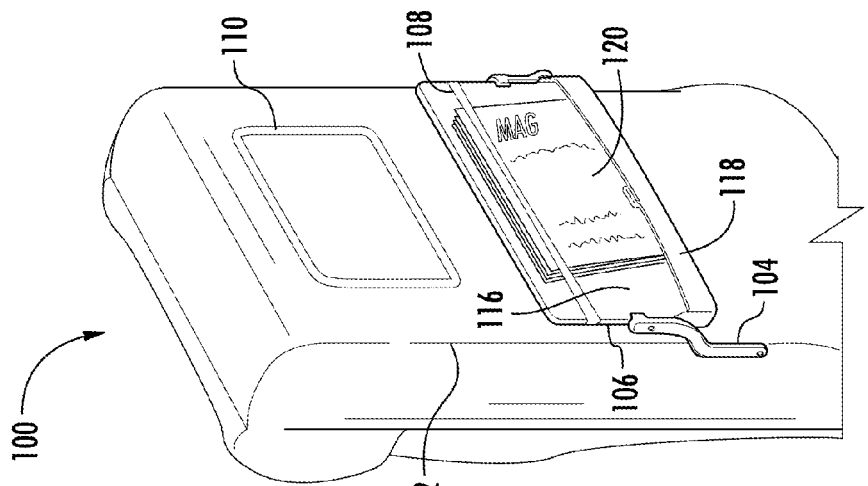
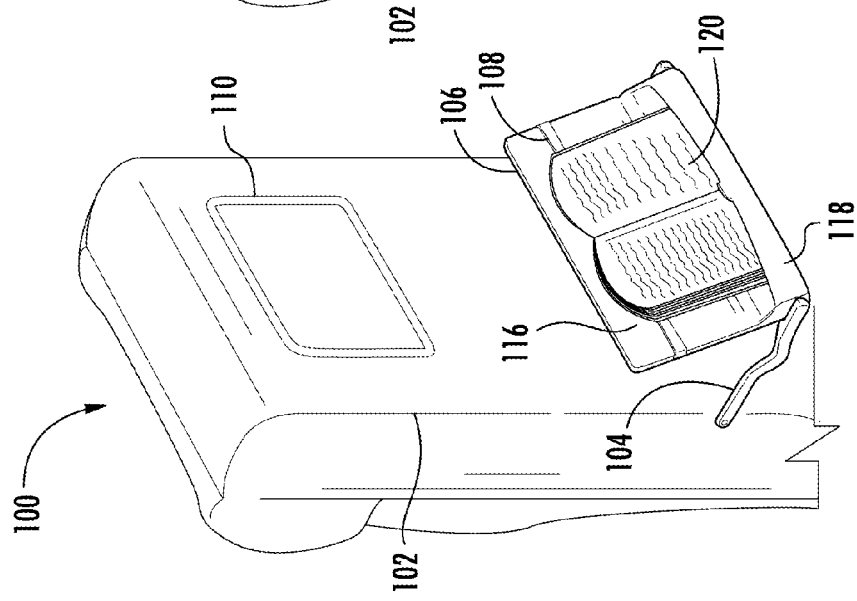
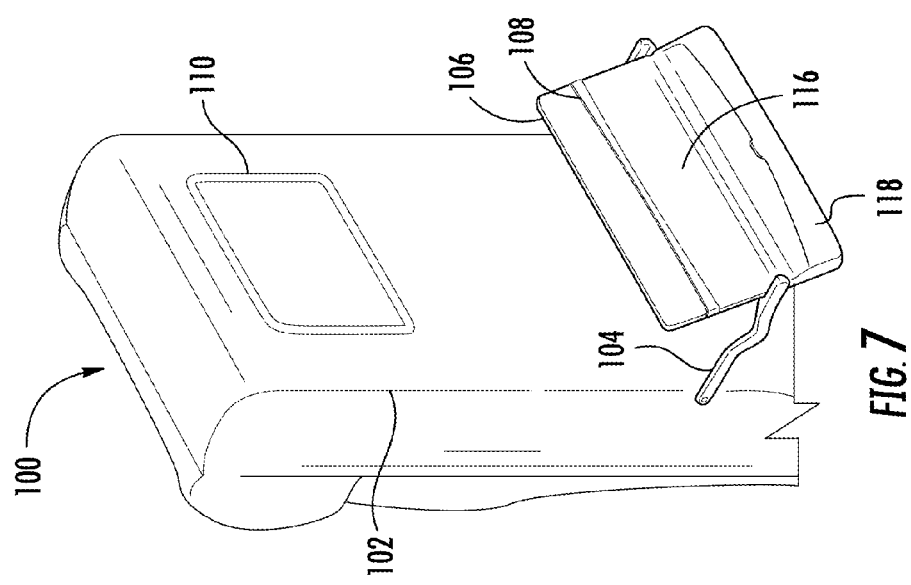

MULTIPURPOSE TRAY

CROSS REFERENCE TO RELATED APPLICATIONS

This application is related to and claims priority benefits from U.S. Provisional Application Ser. No. 61/501,892, filed on Jun. 28, 2011, entitled "Multipurpose Tray" ("the '892 application"). The '892 application is hereby incorporated in its entirety by this reference.

FIELD OF THE INVENTION

The field of the invention relates to passenger seat assemblies. More specifically, it relates to tray tables of passenger seat assemblies, and the like.

BACKGROUND

Many passenger seats, such as those on passenger aircrafts, buses, trains, and the like, are arranged so that each passenger seat, other than the forward-most located passenger seats, faces the back of the next forward passenger seat. To increase a passenger's comfort and enjoyment, many passenger seat backs are utilized to install amenities, such as a tray table, for the passenger's use during the trip.

In some instances, a tray table may be mounted adjacent a surface of a passenger seat back. The tray table may be deployed by the passenger to provide a relatively flat surface for eating, working, recreation, or other uses. Conventionally, these tray tables are mounted to an exterior surface of the seat back. These tray tables generally rotate away from the seat back via tray table arms, which are pivoted at a point on the passenger seat below the tray table, for use by the passenger. Known trays tables are generally limited to only one utility position, however. Moreover, at various times these tray tables may be stowed against the seat back. In this position, the utility of known tray tables is limited.

Thus, given that the features available to a passenger during use of a passenger seat are limited by the small space surrounding the passenger seat, it may be beneficial to maximize the functions of each structure surrounding the passenger, including the tray table, to increase the potential features of the passenger seat.

SUMMARY

Certain embodiments of the present invention include multipurpose tray table systems comprising a passenger seat back, at least one tray table arm pivotally coupled to the passenger seat back, and a tray table pivotally coupled to the at least one tray table arm, comprising a first surface and a second surface, wherein the tray table may be deployed away from the passenger seat back via rotation of the at least one tray table arm about the passenger seat back to a first deployed position such that the first surface of the tray table faces generally upward and the second surface of the tray table faces generally downward, and the tray table may be rotated about the at least one tray table arm into an adjusted deployed position such that the first surface of the tray table faces generally toward the passenger seat back and the second surface of the tray table faces generally away from the passenger seat back.

In some embodiments, the tray table comprises at least one compartment for staging or positioning of a passenger's item in a vertical or angular position for potential use by the passenger during stowage and/or deployment of the tray table. The compartment may be coupled to and/or integrally formed with the second surface of the multipurpose tray table. The at least one compartment may be configured to resemble a pocket and/or may be equipped with at least one power outlet and/or electronic docking station, such as a USB port.

In some embodiments, the tray table comprises at least one support member for staging or positioning of a passenger's item in a vertical or angular position for potential use by the passenger during stowage and/or deployment of the tray table. In certain embodiments, the at least one support member, which may be an elastic band, is coupled to the second surface of the tray table. In some embodiments, the tray table comprises at least one video display for potential use by the passenger during stowage and/or deployment of the tray table.

BRIEF DESCRIPTION OF THE DRAWINGS

FIG. 1 is a perspective view of a multipurpose tray table system according to certain embodiments of the present invention, shown in a stowed position.

FIG. 2 is a perspective view of the multipurpose tray table system of FIG. 1, shown in a conventional horizontal deployed position.

FIG. 3 is a perspective view of the multipurpose tray table system of FIG. 1, shown in an adjusted deployed position.

FIG. 7 is a perspective view of the multipurpose tray table system according to certain embodiments of the present invention, shown in an adjusted deployed position.

FIG. 8 is a perspective view of the multipurpose tray table system of FIG. 7, shown in an adjusted deployed position.

FIG. 9 is a perspective view of the multipurpose tray table system of FIG. 7, shown in a stowed position.

DETAILED DESCRIPTION

Figure 4:
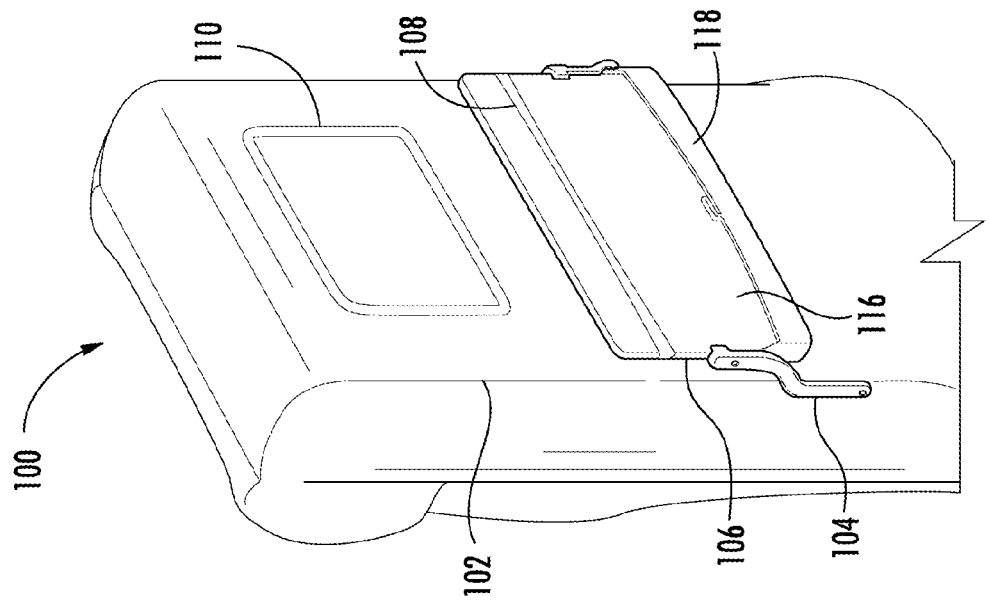
FIG. 4 is a perspective view of a multipurpose tray table system according to certain embodiments of the present invention, shown in a stowed position.
Figure 5:
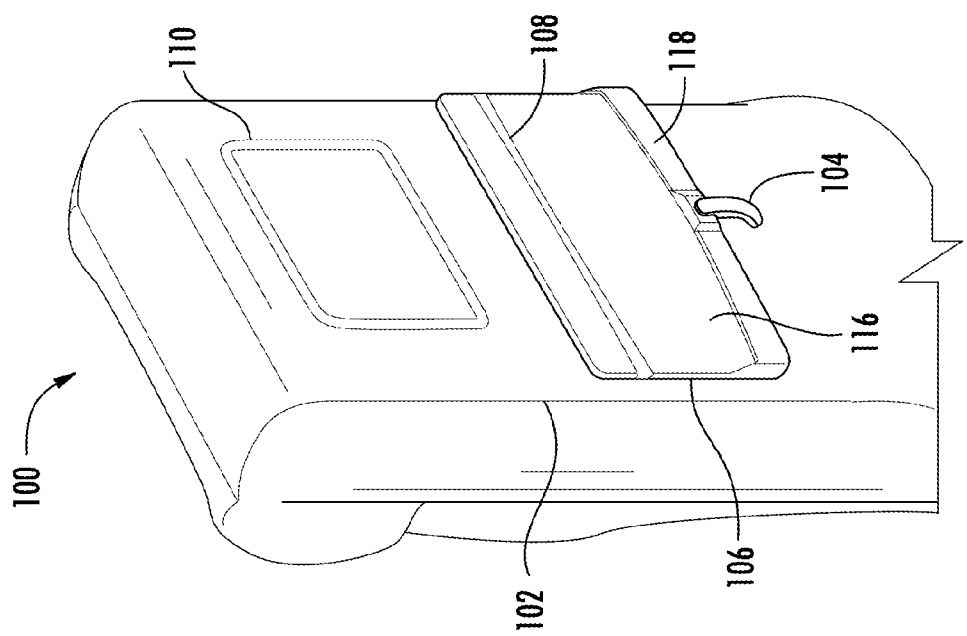
FIG. 5 is a perspective view of a multipurpose tray table system according to certain embodiments of the present invention, shown in a stowed position.

Embodiments of the invention provide multipurpose tray tables and multipurpose tray table systems. While the multipurpose tray tables and multipurpose tray table systems are generally discussed for use with aircrafts, they are by no means so limited. Rather, embodiments of the multipurpose tray tables and multipurpose tray table systems may be used in connection with any mode of transportation or otherwise as desired.

FIGS. 1-11 illustrate embodiments of a multipurpose tray table system 100. In these embodiments, the multipurpose tray table system 100 may comprise a passenger seat back 102, at least one tray table arm 104, and a multipurpose tray table 106. In some embodiments, the multipurpose tray table 106 may comprise at least one support member 108.

The passenger seat back 102, as illustrated in FIGS. 1-11, provides a base for the at least one tray table arm 104. In some embodiments, the passenger seat back 102 may comprise at least one pocket or pouch (not illustrated), at least one video display 110, and/or other known mechanisms or features. One of ordinary skill in the relevant art, however, will understand that the passenger seat back 102 may comprise one or more other mechanisms, or combinations thereof, in addition to the components listed above. The passenger seat back 102 may be formed of materials including but not limited to textiles, plastics, composite plastics, aluminum, other metallic materials, composite materials, or other similar materials. Throughout embodiments, the configuration of the passenger seat back 102 may vary as desired. In some embodiments, one or more portions of the passenger seat back 102 may be configured to receive, or otherwise interact with, the multipurpose tray table 106 upon adjustment toward the passenger seat back 102, such as during stowage of the multipurpose tray table 106.

The tray table arm 104 allows for adjustment of the multipurpose tray table 106 relative to the passenger seat back 102, as illustrated in FIGS. 1-2. For example, as illustrated in FIGS. 1 and 2, the tray table arm 104 may adjust the multipurpose tray table 106 to and from a stowed position within or adjacent the passenger seat back 102 (e.g. stowing or deploying the multipurpose tray table 106). The tray table arm 104 may be pivotally coupled to the passenger seat back 102. In these embodiments, the tray table arm 104 may be pivotally coupled to the passenger seat back 102 by a variety of mechanisms, including but not limited to pins, fasteners, hinges, and other similar mechanisms. For example, in some embodiments, the tray table arm 104 may be pivotally coupled to the passenger seat back 102 via a friction hinge, which relies on a constant friction force within the hinge to hold a position until an excessive torque is applied to overcome the hinge resistance torque and move the tray table arm 104 to another position within its range of motion. As a result, the tray table arm 104 may only be adjusted by direct, intentional force or manipulation by the passenger. In some embodiments, the friction force between the tray table arm 104 and the passenger seat back 102 will likewise prevent unintentional adjustment of the tray table arm 104. In other embodiments, the tray table arm 104 may be secured into place after adjustment or stowage by a variety of mechanisms, including but not limited to a catch, securing mechanism, adjustable fastener, or button mechanism.

The tray table arm 104 may be formed of materials including but not limited to plastics, composite plastics, aluminum, other metallic materials, composite materials, or other similar materials. Throughout embodiments, the shape and/or dimensions of the tray table arm 104 may vary. For example, in some embodiments, the tray table arm 104 may resemble an elongated prism or cylinder. In some embodiments, the tray table arm 104 may be solid. In other embodiments, the tray table arm 104 may be hollow. In some embodiments, such as the embodiments illustrated in FIGS. 1-3 and 5-11, the multipurpose tray table system 100 may comprises two or more tray table arms 104. In some embodiments, such as the embodiments illustrated in FIG. 4, the multipurpose tray table system 100 may comprises only one more tray table arm 104.

The multipurpose tray table 106 provides one or more relatively flat surfaces for eating, working, recreation, or other uses. In some embodiments, the multipurpose tray table 106 may comprise a first surface 112. In these embodiments, the first surface 112 may be a relatively flat surface for eating, working, recreation, or other uses. For example, in some embodiments, such as the embodiments illustrated in FIG. 2, the first surface 112 may comprise an indention 114 for a cup. In these embodiments, as illustrated in FIGS. 1-2, the first surface 112 faces the passenger seat back 102 during stowage of the multipurpose tray table 106 and faces generally upward during conventional horizontal deployment of the multipurpose tray table 106. In some embodiments, the multipurpose tray table 106 may comprise a second surface 116. In some embodiments, the second surface 116 may be a relatively flat surface for eating, working, recreation, or other uses. In these embodiments, as illustrated in FIGS. 1-2, the second surface 116 faces a passenger, and away from the passenger seat back 102, during stowage of the multipurpose tray table 106 and generally downward during conventional deployment of the multipurpose tray table 106. In some embodiments, the first surface 112 and/or second surface 116 may be rough or textured.

In some embodiments, the second surface 116 of the multipurpose tray table 106 may be configured to supplement the traditional functions of the multipurpose tray table 106, during deployment and/or stowage. For example, in some embodiments, such as the embodiments illustrated in FIGS. 1, 3, and 5-10, the second surface 116 may comprise at least one compartment 118 for staging or positioning of a passenger's item 120, such as a magazine, newspaper, electronic device, or other similar items, in a vertical or angular position for potential use by the passenger. In some embodiments, the compartment 118 may also be equipped with power outlets and/or electronic docking stations, such as a USB port or other similar outlets and stations. The positioning of the compartment 118 on the second surface 116 of the multipurpose tray table 106 allows for use of the compartment 118 during both stowage of the multipurpose tray table 106 and adjusted deployment of the multipurpose tray table 106, as explained below, and as illustrated in FIGS. 1, 3, and 5-10.

The compartment 118 may be formed of materials including but not limited to plastics, composite plastics, aluminum, other metallic materials, composite materials, or other similar materials. Throughout embodiments, the shape and/or dimensions of the compartment 118 may vary. For example, in some embodiments, the compartment 118 may resemble a tray, pocket, or ledge, or other similar configuration. In some embodiments, the compartment 118 may be integrally formed with the multipurpose tray table 106. In other embodiments, the compartment 118 may be coupled to the multipurpose tray table 106 by a variety of coupling mechanisms, including but not limited to adhesives, screws, bolts, fasteners, and other similar mechanisms. In some embodiments, the compartment 118 may be releasably coupled to the second surface 116 of the multipurpose tray table 106.

Figure 11:
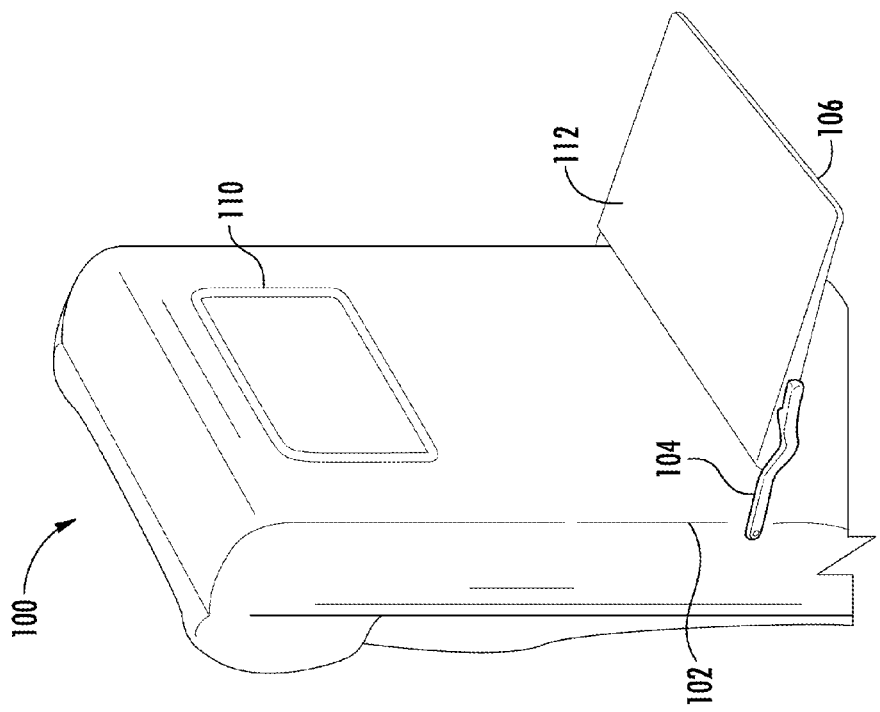
FIG. 11 is a perspective view of the multipurpose tray table system of FIG. 10, shown in a conventional horizontal deployed position.
Figure 10:
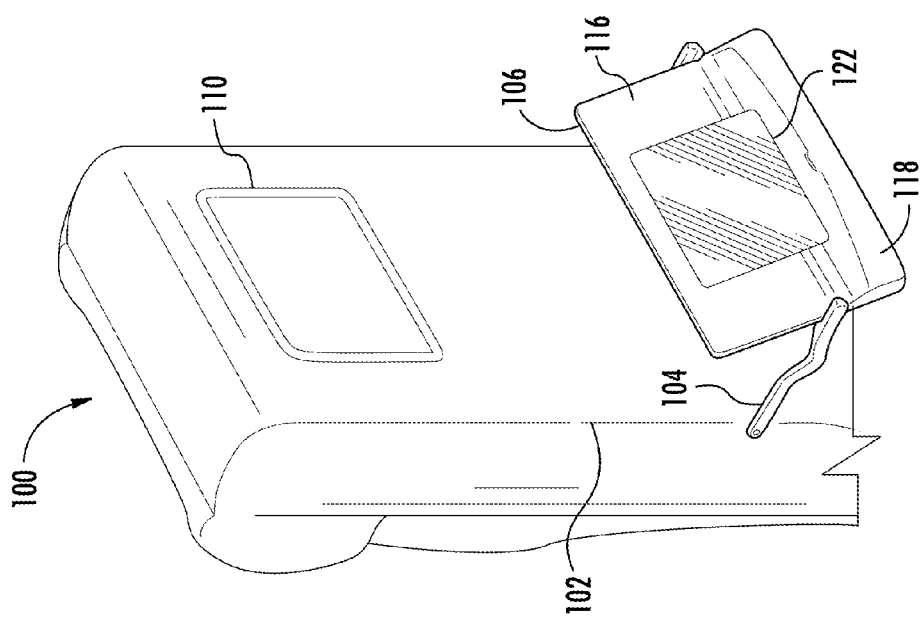
FIG. 10 is a perspective view of a multipurpose tray table system according to certain embodiments of the present invention, shown in an adjusted deployed position.

Additionally, in some embodiments, such as the embodiments illustrated in FIG. 11, the second surface 116 of the multipurpose tray table 106 may be configured to comprise at least one video display 122. The positioning of the video display 122 on the second surface 116 of the multipurpose tray table 106 allows for use of the video display 122 during both stowage and adjusted deployment of the multipurpose tray table 106, as explained below, and as illustrated in FIG. 10. In these embodiments, the second surface 116 of the multipurpose tray table 106 may also comprise one or more actuators or controls (not illustrated) for the video display 122.

The multipurpose tray table 106 may be coupled to the at least one tray table arm 104. In some embodiments, the multipurpose tray table 106 may be fixedly coupled to the at least one tray table arm 104 by a variety of mechanisms, including but not limited to adhesives, screws, fasteners, and other similar mechanisms. In these embodiments, the first surface 112 faces generally upward during conventional deployment of the multipurpose tray table 106. In these embodiments, the second surface 116 faces generally downward during conventional deployment of the multipurpose tray table 106.

Figure 6:
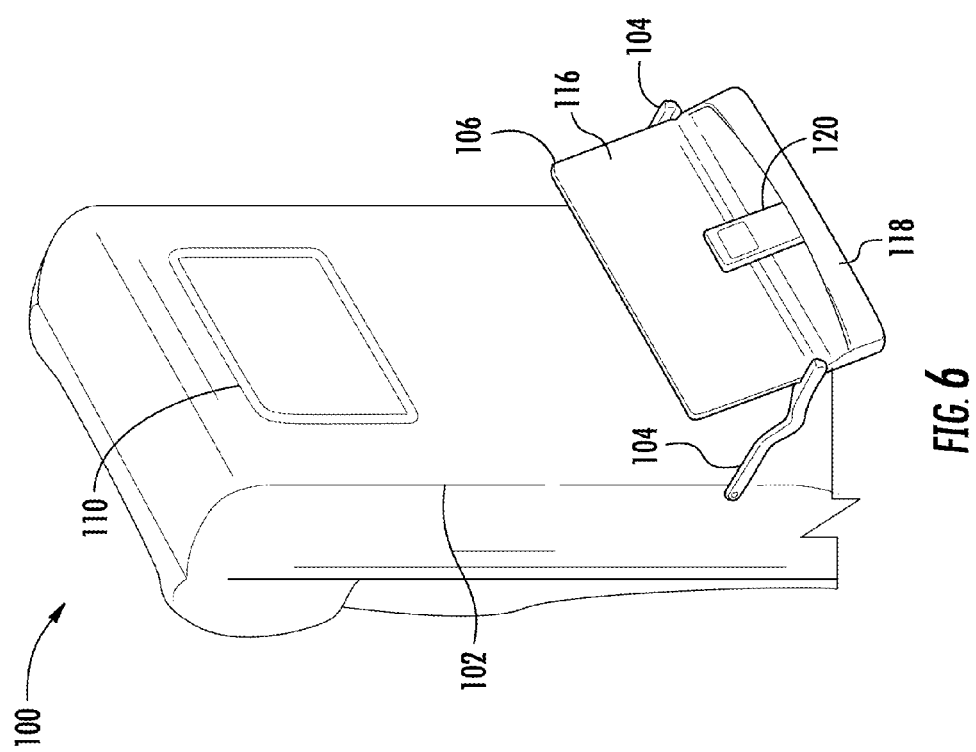
FIG. 6 is a perspective view of a multipurpose tray table system according to certain embodiments of the present invention, shown in an adjusted deployed position.

In other embodiments, such as the embodiments illustrated in FIGS. 3, 6-8, and 10, the multipurpose tray table 106 may be pivotally coupled to the at least one tray table arm 104. In these embodiments, the multipurpose tray table 106 may be adjusted relative to the tray table arm 104 to achieve various adjusted deployment positions, as illustrated in FIGS. 3, 6-8, and 10, in addition to the conventional horizontal deployment position illustrated in FIGS. 2 and 11. In some embodiments, the multipurpose tray table 106 may be pivotally coupled to the at least one tray table arm 104 such that the multipurpose tray table 106 may be capable of rotating more than 90 degrees in at least one direction about the table arm 104. In these embodiments, as illustrated in FIGS. 3, 6-8, and 10, the multipurpose tray table 106 may be adjusted such that the second surface 116 of the multipurpose tray table 106 may generally face a passenger during an adjusted deployment of the multipurpose tray table 106. In these embodiments, the multipurpose tray table 106 may be adjusted to allow for vertical or angular staging or positioning of the passenger's item 120 within the compartment 118, as illustrated in FIGS. 6 and 8.

In these embodiments, the multipurpose tray table 106 may be pivotally coupled to the at least one tray table arm 104 by a variety of mechanisms, including but not limited to pins, fasteners, hinges, and other similar mechanisms. For example, in some embodiments, the multipurpose tray table 106 may be pivotally coupled to the at least one tray table arm 104 via a friction hinge, which relies on a constant friction force within the hinge to hold a position until an excessive torque is applied to overcome the hinge resistance torque and move the multipurpose tray table 106 to another position within its range of motion. As a result, the multipurpose tray table 106 may only be adjusted by direct, intentional force or manipulation by the passenger. In some embodiments, the friction force between the multipurpose tray table 106 and the at least one tray table arm 104 will likewise prevent unintentional adjustment of the tray table arm 104. In other embodiments, the multipurpose tray table 106 may be secured into place after adjustment or stowage by a variety of mechanisms, including but not limited to a catch, securing mechanism, adjustable fastener, or button mechanism.

The multipurpose tray table 106 may be formed of materials including but not limited to plastics, composite plastics, aluminum, other metallic materials, composite materials, or other similar materials. Throughout embodiments, the shape and/or dimensions of the multipurpose tray table 106 may vary as desired. For example, in some embodiments, such as the embodiments illustrated in FIGS. 1-11, the multipurpose tray table 106 may resemble a flattened three-dimensional square or rectangle or other similar shape. In some embodiments, the multipurpose tray table 106 may have variable thickness or depth across its shape. In some embodiments, the multipurpose tray table 106 may be solid. In other embodiments, the multipurpose tray table 106 may be hollow.

In some embodiments, the multipurpose tray table 106 may comprise the at least one support member 108. The support member 108 supplements the traditional functions of the multipurpose tray table 106, during deployment and/or stowage. In some embodiments, the support member 108 may be coupled to the second surface 116 of the multipurpose tray table 106. For example, in some embodiments, such as the embodiments illustrated in FIGS. 4-5 and 7-9, the support member 108 may assist in the staging or positioning of the passenger's item 120, such as a magazine, newspaper, electronic device, or other similar items, in a vertical or angular position for potential use by the passenger. The positioning of the support member 108 on the second surface 116 of the multipurpose tray table 106 allows for use of the support member 108 during both stowage and adjusted deployment of the multipurpose tray table 106, as illustrated in FIGS. 4-5 and 7-9. In some embodiments, the support member 108 may be coupled to the second surface 116 of the multipurpose tray table 106 by a variety of coupling mechanisms, including but not limited to adhesives, screws, bolts, fasteners, and other similar mechanisms. In some embodiments, the support member 108 may be releasably coupled to the second surface 116 of the multipurpose tray table 106. The support member 108 may be formed from a variety of materials, including but not limited to bands, string, wire, fiber, plastic, netting, or other similar materials. For example, in the embodiments illustrated in FIGS. 4-5 and 7-9, the support member 108 may be formed by a band comprised of elastic material, such as a rubber band. In other embodiments, the support member 108 may be integrally formed with and/or coupled to the multipurpose tray table 106. In these embodiments, the support member 108 may be formed by an indention or ledge integrally formed with the multipurpose tray table 106. One of ordinary skill in the relevant art, however, will understand that the support member 108 may be formed of other materials, or combinations thereof, in addition to the materials listed above.

In use, a passenger can enjoy the increased functionality of the multipurpose tray table 106 during both stowage and deployment. During stowage of the multipurpose tray table 106, a passenger may enjoy the increased functionality of the multipurpose tray table 106 via the compartment 118 and/or the support member 108, as illustrated in FIGS. 1, 4-5, and 9. For example, during stowage of the multipurpose tray table 106, a passenger can utilize the compartment 118 and/or the support member 108 to stage or position the passenger's item 120, such as a magazine, newspaper, electronic device, or other similar items, in a vertical position, as illustrated in FIG. 9. During deployment of the multipurpose tray table 106, a passenger may enjoy increased functionality of the multipurpose tray table 106 via the adjustability of the multipurpose tray table 106, the compartment 118, and/or the support member 108, as illustrated in FIGS. 3, 6-8, and 10. For example, a passenger may adjust the multipurpose tray table 106 about the tray table arm 104 and into an adjusted deployment position, as illustrated in FIGS. 3, 6-8, and 10, thereby exposing the second surface 116 of the multipurpose tray table 106, and its functionality, to the passenger. Of course, a passenger may also still deploy the multipurpose tray table 106 into the conventional horizontal deployed position for use of the first surface 112 of the multipurpose tray table 106, as illustrated in FIGS. 2 and 11.

In use, a passenger can similarly also enjoy the increased functionality of the multipurpose tray table 106 during both stowage and deployment in those embodiments wherein the second surface 116 of the multipurpose tray table 106 comprises the video display 122, as illustrated in FIG. 10.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A multipurpose tray table system comprising:
  a passenger seat back;
  at least one tray table arm pivotally coupled to the passenger seat back;

a tray table pivotally coupled about a central axis to the at least one tray table arm via a friction hinge, the tray table comprising a first surface and a second surface, wherein the second surface comprises an amenity;

wherein the tray table comprises a stowed position in which the tray table is positioned proximate the passenger seat back with the first surface facing the passenger seat back and the second surface facing away from the passenger seat back so that the second surface is accessible by a passenger seated behind the passenger seat back when the tray table is stowed;

wherein the tray table comprises a range of deployed positions in which the tray table is rotated about the central axis into a desired position angle of the first surface or the second surface relative to the passenger seated behind the passenger seat back; and wherein the tray table is secured at the desired position angle by the friction hinge.

2. The multipurpose tray table system of claim 1, wherein the second surface of the tray table comprises at least one compartment for staging or positioning of a passenger's item in a vertical or angular position for potential use by the passenger seated behind the passenger seat back during stowage and/or deployment of the tray table.

3. The multipurpose tray table system of claim 2, wherein the at least one compartment is configured to resemble a pocket.

4. The multipurpose tray table system of claim 2, wherein the at least one compartment is equipped with at least one power outlet and/or electronic docking station, such as a USB port.

5. The multipurpose tray table system of claim 1, wherein the tray table comprises at least one support member for staging or positioning of a passenger's item in a vertical or angular position for potential use by the passenger seated behind the passenger seat back during stowage and/or deployment of the tray table.

6. The multipurpose tray table system of claim 5, wherein the at least one support member is coupled to the second surface of the tray table.

7. The multipurpose tray table system of claim 6, wherein the at least one support member is an elastic band.

8. The multipurpose tray table system of claim 1, wherein the second surface of the tray table comprises at least one video display.

9. A multipurpose tray table system comprising:
a passenger seat back;
at least one tray table arm pivotally coupled to the passenger seat back;
a tray table pivotally coupled about a central axis to the at least one tray table arm via a friction hinge, the tray table comprising a first surface and a second surface, wherein the second surface comprises at least one compartment for staging or positioning of a passenger's item,
wherein the tray table comprises a stowed position in which the tray table is positioned proximate the passenger seat back with the first surface facing the passenger seat back and the second surface facing away from the passenger seat back so that the second surface is accessible by a passenger seated behind the passenger seat back when the tray table is stowed;
wherein the tray table comprises a range of deployed positions in which the tray table is rotated about the central axis into a desired position angle of the first surface or the second surface relative to the passenger seated behind the passenger seat back; and wherein the tray table is secured at the desired position angle by the friction hinge.

10. The multipurpose tray table system of claim 9, wherein the at least one compartment is integrally formed with the second surface.

11. The multipurpose tray table system of claim 9, wherein the second surface further comprises at least one support member for staging or positioning of the passenger's item.

12. A multipurpose tray table system comprising:
a passenger seat back;
at least one tray table arm pivotally coupled to the passenger seat back;
a tray table pivotally coupled about a central axis to the at least one tray table arm via a friction hinge, the tray table comprising a first surface and a second surface, wherein the second surface comprises at least one support member for staging or positioning of a passenger's item in a vertical or angular position for potential use by a passenger seated behind the passenger seat back during stowage and/or deployment of the tray table;
wherein the tray table comprises a stowed position in which the tray table is positioned proximate the passenger seat back with the first surface facing the passenger seat back and the second surface facing away from the seat back so that the second surface is accessible by the passenger seated behind the passenger seat back when the tray table is stowed;
wherein the tray table comprises a range of deployed positions in which the tray table is rotated about the central axis into a desired position angle of the first surface or the second surface relative to the passenger seated behind the passenger seat back; and
wherein the tray table is secured at the desired position angle by the friction hinge.

13. The multipurpose tray table system of claim 12, wherein the at least one support member is coupled to the second surface.

14. The multipurpose tray table system of claim 12, wherein the at least one support member is integrally formed with the second surface.

15. The multipurpose tray table system of claim 12, wherein the second surface further comprises at least one compartment for staging or positioning of the passenger's item.

16. The multipurpose tray table system of claim 12, wherein the at least one support member is an elastic band.

17. A multipurpose tray table system comprising:
a passenger seat back;
at least one tray table arm pivotally coupled to the passenger seat back;
a tray table pivotally coupled about a central axis to the at least one tray table arm via a friction hinge, the tray table comprising a first surface and a second surface, wherein the second surface comprises at least one video display for potential use by a passenger seated behind the passenger seat back during stowage and/or deployment of the tray table;
wherein the tray table comprises a stowed position in which the tray table is positioned proximate the passenger seat back with the first surface facing the passenger seat back and the second surface facing away from the passenger seat back so that the second surface is accessible by the passenger seated behind the passenger seat back when the tray table is stowed;
wherein the tray table comprises a range of deployed positions in which the tray table is rotated about the central axis into a desired position angle of the first surface or the second surface relative to the passenger seated behind the passenger seat back; and wherein the tray table is secured at the desired position angle by the friction hinge.

* * * * *